United States Patent
Zhou et al.

(10) Patent No.: US 8,696,934 B2
(45) Date of Patent: Apr. 15, 2014

(54) OXIDE LUMINESCENT MATERIALS ACTIVATED BY TRIVALENT THULIUM AND THEIR PREPARATIONS

(75) Inventors: Mingjie Zhou, Guangdong (CN); Wenbo Ma, Guangdong (CN); Zhaopu Shi, Guangdong (CN)

(73) Assignee: Ocean's King Lighting Science & Technology Co., Ltd., Shenzhen (CN)

( * ) Notice: Subject to any disclaimer, the term of this patent is extended or adjusted under 35 U.S.C. 154(b) by 212 days.

(21) Appl. No.: 13/254,860

(22) PCT Filed: Mar. 6, 2009

(86) PCT No.: PCT/CN2009/070666
§ 371 (c)(1),
(2), (4) Date: Sep. 21, 2011

(87) PCT Pub. No.: WO2010/099665
PCT Pub. Date: Sep. 10, 2010

(65) Prior Publication Data
US 2012/0132856 A1    May 31, 2012

(51) Int. Cl.
*C09K 11/02*    (2006.01)
*C09K 11/08*    (2006.01)
(52) U.S. Cl.
USPC .................................................. 252/301.4 R
(58) Field of Classification Search
USPC .................................................. 252/301.4 R
See application file for complete search history.

(56) References Cited

U.S. PATENT DOCUMENTS

| | | | | |
|---|---|---|---|---|
| 2002/0158234 | A1* | 10/2002 | Suzuki | 252/500 |
| 2005/0035332 | A1* | 2/2005 | Nagashima et al. | 252/301.36 |
| 2007/0215837 | A1* | 9/2007 | Chiruvolu et al. | 252/301.4 R |
| 2007/0281324 | A1* | 12/2007 | Perriat et al. | 435/7.5 |
| 2008/0248587 | A1* | 10/2008 | Lagwinski et al. | 436/172 |

FOREIGN PATENT DOCUMENTS

CN    101372617 A  *  2/2009

OTHER PUBLICATIONS

Machine translation of CN101372617A.*
Nakanishi et al., "Growth and Characterization of Y2O3:Tm Thin-Film Blue-Emitting Phosphor", 1999, Journal of the Electrochemical Society, vol. 146, pp. 4320-4323.*

* cited by examiner

*Primary Examiner* — Emily Le
*Assistant Examiner* — Lynne Edmondson

(57) ABSTRACT

The present invention relates to oxide luminescent materials activated by trivalent thulium and their preparations. The luminescent materials are the compounds with the following general formula: $(RE_{1-x}Tm_x)_2O_3$, wherein a range of x is $0<x\leq0.05$ and RE is one or two selected from Y, Gd, La, Lu and Sc. These materials are prepared by Sol-Gel method or high temperature solid phase method using metal oxide of $Tm^{3+}$, chloride of $Tm^{3+}$, nitrate of $Tm^{3+}$, carbonate of $Tm^{3+}$ or oxalate of $Tm^{3+}$, and one or two of oxide $Y^{3+}$, $Gd^{3+}$, $La^{3+}$, $Lu^{3+}$ or $Sc^{3+}$, chloride $Y^{3+}$, $Gd^{3+}$, $La^{3+}$, $Lu^{3+}$ or $Sc^{3+}$, nitrate $Y^{3+}$, $Gd^{3+}$, $La^{3+}$, $Lu^{3+}$ or $Sc^{3+}$, carbonate $Y^{3+}$, $Gd^{3+}$, $La^{3+}$, $Lu^{3+}$ or $Sc^{3+}$ and oxalate of $Y^{3+}$, $Gd^{3+}$, $La^{3+}$, $Lu^{3+}$ or $Sc^{3+}$ as raw material. The present oxide luminescent materials activated by trivalent thulium have high stability, color purity and luminous efficiency, and the methods can easily be operated.

5 Claims, 1 Drawing Sheet

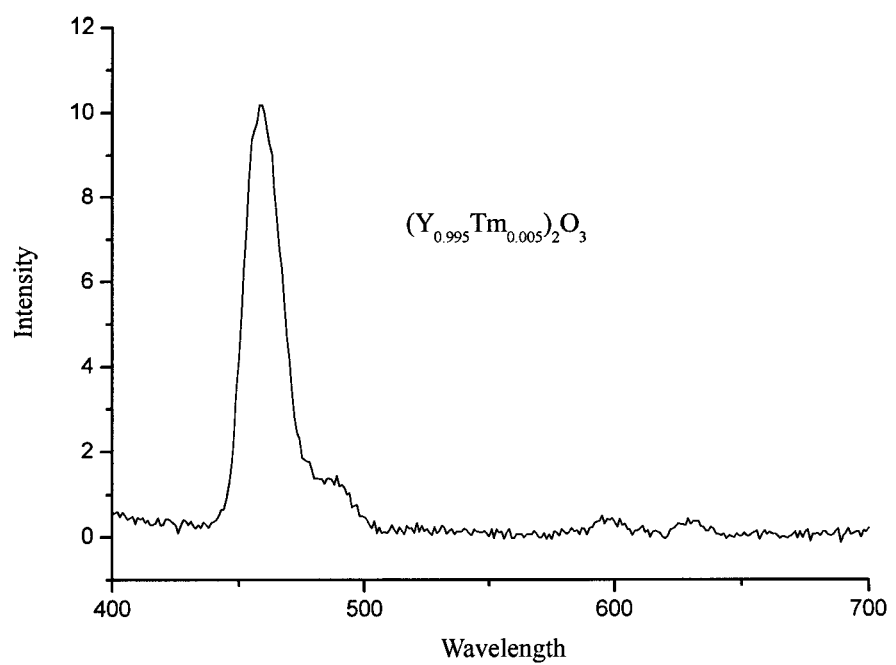

OXIDE LUMINESCENT MATERIALS ACTIVATED BY TRIVALENT THULIUM AND THEIR PREPARATIONS

FIELD OF THE INVENTION

The present invention relates to luminescent materials and their preparations, in particular to oxide luminescent materials activated by trivalent thulium and their preparations.

BACKGROUND OF THE INVENTION

In the 1960s, Ken Shoulder put forward a hypothesis of an electron beam micro device on the basis of field emission cathode assay (FEAs). Accordingly, the researches on the design and manufacture of panel displays and light source devices utilizing FEAs have aroused people's great interest. The operating principle of such kind of new-type field emission device is similar to that of the traditional cathode-ray tube (CRT), which achieves imaging or lighting applications through the bombardment of the electron beam on three-colored fluorescent powder of red, green and blue. Such kind of field emission device has potential advantages in luminosity, visual angle, response time, operating temperature range and energy consumption and so on. But, the blue-light issue is always one of the important factors that restrict the development of such device. Therefore, the preparation of blue light emitting material with high luminosity, high efficiency, high color purity and long service life is one of the important research subjects in present field. At present, the blue-light luminescent material applied in the field emission device is generally zinc sulfide activated by silver, one kind of traditional fluorescent powder used by CRT, which possesses extremely high efficiency when activated by an electron beam. However, such kind of luminescent material has one great drawback of strong saturability. The luminous efficiency of this luminescent material reduces rapidly with the increase of the power of the electron beam. At the same time, this kind of sulfide luminescent material easily decomposes when bombarded by a large electron beam and gives off the elementary sulfur which poisons the cathode electron emitter and shortens the service life of the field emission device. For this reason, the zinc sulfide activated by silver that emits blue light is not suitable for the application in the field emission device, and the search of a corresponding substituted material becomes very necessary. In 2007, one kind of nitride material AlN:$Eu^{2+}$ emitting blue light is put forward by N. Hirosaki et al and used in the field emission device. Such kind of material possesses a good saturation characteristic and stable service life. Nevertheless, the preparation conditions for this kind of material are very rigorous, i.e. technological conditions such as a high temperature above 2000° C., oxygen-free environment and high pressure are required.

SUMMARY OF THE INVENTION

The objective of the present invention is to provide oxide luminescent materials activated by trivalent thulium with high stability, color purity and luminous efficiency, aiming at the problems in the blue luminescent materials of the prior art that the zinc sulfide activated by silver has strong saturability, i.e. the luminous efficiency of the zinc sulfide activated by silver reduces rapidly with the increase of the power of the electron beam, the zinc sulfide activated by silver easily decomposes and gives off the elementary sulfur which poisons the cathode electron emitter and shortens the service life of field emission device when it is bombarded by a large electron beam, and the preparation conditions for the blue luminescent material AlN:$Eu^{2+}$ are rigorous.

Another objective of the present invention is to provide a preparation method for the oxide luminescent materials activated by trivalent thulium which requires simple preparation conditions and can be implemented in various ways.

According to an aspect, oxide luminescent materials activated by trivalent thulium are provided, which are compounds with following general formula: $(RE_{1-x}Tm_x)_2O_3$, wherein a range of x is $0<x\leq0.05$ and RE is one or two selected from Y, Gd, La, Lu and Sc.

Preferably, the range of x is $0<x\leq0.03$.

A first kind of preparation method for the oxide luminescent materials activated by trivalent thulium is provided, wherein the oxide luminescent materials activated by trivalent thulium are Prepared by Sol-Gel Method using metal oxide of $Tm^{3+}$, chloride of $Tm^{3+}$, nitrate of $Tm^{3+}$, carbonate of $Tm^{3+}$ or oxalate of $Tm^{3+}$ and one or two of oxide of $Y^{3+}$, $Gd^{3+}$, $La^{3+}$, $Lu^{3+}$ or $Sc^{3+}$, chloride of $Y^{3+}$, $Gd^{3+}$, $La^{3+}$, $Lu^{3+}$ or $Sc^{3+}$, nitrate of $Y^{3+}$, $Gd^{3+}$, $La^{3+}$, $Lu^{3+}$ or $Sc^{3+}$, carbonate of $Y^{3+}$, $Gd^{3+}$, $La^{3+}$, $Lu^{3+}$ or $Sc^{3+}$ and oxalate of $Y^{3+}$, $Gd^{3+}$, $La^{3+}$, $Lu^{3+}$ or $Sc^{3+}$ as raw materials.

The first kind of preparation method for the oxide luminescent materials activated by trivalent thulium comprises following steps:

(1) taking metal oxide of $Tm^{3+}$, chloride of $Tm^{3+}$, nitrate of $Tm^{3+}$, carbonate of $Tm^{3+}$ or oxalate of $Tm^{3+}$ and one or two of oxide of $Y^{3+}$, $Gd^{3+}$, $La^{3+}$, $Lu^{3+}$ or $Sc^{3+}$, chloride of $Y^{3+}$, $Gd^{3+}$, $La^{3+}$, $Lu^{3+}$ or $Sc^{3+}$, nitrate of $Y^{3+}$, $Gd^{3+}$, $La^{3+}$, $Lu^{3+}$ or $Sc^{3+}$, carbonate of $Y^{3+}$, $Gd^{3+}$, $La^{3+}$, $Lu^{3+}$ or $Sc^{3+}$ and oxalate of $Y^{3+}$, $Gd^{3+}$, $La^{3+}$, $Lu^{3+}$ or $Sc^{3+}$ as raw materials and weighing the raw materials in a stoichiometric ratio of chemical formula $(RE_{1-x}Tm_x)_2O_3$, wherein a range of x is $0<x\leq0.05$ and RE is one or two selected from Y, Gd, La, Lu and Sc;

(2) dissolving the metal oxide, carbonate or oxalate of the raw materials in step (1) in hydrochloric acid or nitric acid, or dissolving the chloride and nitrate of the raw materials in step (1) in water directly;

(3) adding citric acid, water and ethanol to form a mixed solution on the foundation of step (2), wherein a volume ratio of the water and the ethanol is 1:2~6 and the molar ratio of the citric acid and metal ion in the raw materials is 2~5:1; stirring the mixed solution for 2~6 h at 70~100° C. and heating the mixed solution at 120~180° C. for 4~12 h and then obtaining a xerogel;

(4) grinding the xerogel into powder, calcinating the powder at a constant temperature for 2~8 h after the temperature has been risen to 7001350° C. at a heating rate of 60~500° C./h and then obtaining the oxide luminescent materials activated by trivalent thulium.

In the first kind of preparation method for the oxide luminescent materials activated by trivalent thulium, in the step (3), preferably, the volume ratio of the water and the ethanol is 1:3~5 and the molar ratio of the citric acid and the metal ion in the raw materials is 2~4:1; the mixed solution is water bath heated and stirred at 75~85° C. for 2~4 h, then heated at 140~160° C. for 4~8 h to evaporate solvent and obtain the xerogel.

In the first kind of preparation method for the oxide luminescent materials activated by trivalent thulium, in the step (4), preferably grinding the xerogel into powder, placing the powder in a high temperature furnace, calcinating the powder at a constant temperature for 3~5 h after the temperature has been risen to 800~1200° C. at a heating rate of 300~500° C./h and then obtaining the oxide luminescent materials activated by trivalent thulium.

A second kind of preparation method for the oxide luminescent materials activated by trivalent thulium is provided, wherein the oxide luminescent materials activated by trivalent thulium are prepared by high temperature solid phase method using metal oxide of $Tm^{3+}$, chloride of $Tm^{3+}$, nitrate of $Tm^{3+}$, carbonate of $Tm^{3+}$ or oxalate of $Tm^{3+}$ and one or two of oxide of $Y^{3+}$, $Gd^{3+}$, $La^{3+}$, $Lu^{3+}$ or $Sc^{3+}$, chloride of $Y^{3+}$, $Gd^{3+}$, $La^{3+}$, $Lu^{3+}$ or $Sc^{3+}$, nitrate of $Y^{3+}$, $Gd^{3+}$, $La^{3+}$, $Lu^{3+}$ or $Sc^{3+}$, carbonate of $Y^{3+}$, $Gd^{3+}$, $La^{3+}$, $Lu^{3+}$ or $Sc^{3+}$ and oxalate of $Y^{3+}$, $Gd^{3+}$, $La^{3+}$, $Lu^{3+}$ or $Sc^{3+}$ as raw materials.

The second kind of preparation method for the oxide luminescent materials activated by trivalent thulium comprises following steps:

(1) taking metal oxide of $Tm^{3+}$, chloride of $Tm^{3+}$, nitrate of $Tm^{3+}$, carbonate of $Tm^{3+}$ or oxalate of $Tm^{3+}$ and one or two of oxide of $Y^{3+}$, $Gd^{3+}$, $La^{3+}$, $Lu^{3+}$ or $Sc^{3+}$, chloride of $Y^{3+}$, $Gd^{3+}$, $La^{3+}$, $Lu^{3+}$ or $Sc^{3+}$, nitrate of $Y^{3+}$, $Gd^{3+}$, $La^{3+}$, $Lu^{3+}$ or $Sc^{3+}$, carbonate of $Y^{3+}$, $Gd^{3+}$, $La^{3+}$, $Lu^{3+}$ or $Sc^{3+}$ and oxalate of $Y^{3+}$, $Gd^{3+}$, $La^{3+}$, $Lu^{3+}$ or $Sc^{3+}$ as raw materials and weighing the raw materials in the stoichiometric ratio of chemical formula $(RE_{1-x}Tm_x)_2O_3$, wherein a range of x is $0<x\leq0.05$ and RE is one or two selected from Y, Gd, La, Lu and Sc;

(2) grinding the raw materials uniformly, sintering the ground raw materials at 900~1500° C. for 4~10 h, cooling the sintering product to room temperature, annealing the sintering product at 800~1000° C. and then obtaining the oxide luminescent materials activated by trivalent thulium.

In the second kind of preparation method for the oxide luminescent materials activated by trivalent thulium, in the step (2), preferably grinding the raw materials in a mortar for uniform grind, sintering the ground raw materials at 1200~1400° C. for 5~8 h, cooling the sintering product to room temperature, annealing the sintering product at 850~950° C. and then obtaining the oxide luminescent materials activated by trivalent thulium.

The oxide luminescent materials activated by trivalent thulium prepared according to the present invention have the characteristics of good stability, high color purity, and higher low voltage cathode-ray luminous efficiency and so on. Moreover, the technological conditions of the preparation method are simple and the preparation method is diversiform.

BRIEF DESCRIPTION OF THE DRAWINGS

The present invention will be further described with reference to the accompanying drawings and embodiments in the following. In the Figures:

FIG. 1 is the cathodoluminescence spectrum diagram of the embodiment 1 in the present invention;

The test condition for the cathodoluminescence spectrum diagram is as follows: the excitation voltage is 5 kV and the beam current is 8 μA.

DETAILED DESCRIPTION OF THE PREFERRED EMBODIMENT

Example 1

$(Y_{0.995}Tm_{0.005})_2O_3$ Prepared by Sol-Gel Method 0.995 mmol $Y_2O_3$ and 0.005 mmol $Tm_2O_3$ are dissolved in 1 ml nitric acid and 2 ml deionized water in a vessel at room temperature. 30 ml mixed solution of ethanol and water with a volume ratio of 3:1 is further added after cooling and 0.84 g citric acid is added under stirring condition. The resultant mixtures were stirred for 2 h and heated at 80° C. in a water bath until homogeneous gels formed. After being dried in an oven at 150° C. for 6 h, a xerogel is obtained and ground into powder. Afterwards the powder is placed in a high temperature furnace, in which the temperature is risen to 900° C. at a heating rate of 300° C./h. The powder is sintered for 4 h at such temperature so as to obtain blue emission fluorescent powder $(Y_{0.995}Tm_{0.005})_2O_3$ with uniform particle size. Under the low-voltage cathode-ray excitation, the blue emission fluorescent powder $(Y_{0.995}Tm_{0.005})_2O_3$ emits blue light with a half-wave width less than 20 nm as shown in FIG. 1 and good color purity.

Example 2

$(Y_{0.99}Tm_{0.01})_2O_3$ prepared by Sol-Gel Method 0.99 mmol $Y_2O_3$ and 0.01 mmol $Tm_2O_3$ are dissolved in 1 ml nitric acid and 2 ml deionized water in a vessel at room temperature. 30 ml mixed solution of ethanol and water with a volume ratio of 2:1 is further added after cooling and 0.90 g citric acid is added under stirring condition. The resultant mixtures were stirred for 6 h and heated at 70° C. in a water bath until homogeneous gels formed. After being dried in an oven at 120° C. for 12 h, a xerogel is obtained and ground into powder. Afterwards the powder is placed in a high temperature furnace, in which the temperature is risen to 700° C. at a heating rate of 60° C./h. The powder is sintered for 8 h at such temperature so as to obtain blue emission fluorescent powder $(Y_{0.99}Tm_{0.01})_2O_3$ with uniform particle size. Under the low-voltage cathode-ray excitation, the blue emission fluorescent powder $(Y_{0.99}Tm_{0.01})_2O_3$ emits blue light with a half-wave width less than 20 nm and good color purity.

Example 3

$(Y_{0.95}Tm_{0.05})_2O_3$ Prepared by Sol-Gel Method 0.95 mmol $Y_2O_3$ and 0.05 mmol $Tm_2O_3$ are dissolved in 1 ml nitric acid and 2 ml deionized water in a vessel at room temperature. 30 ml mixed solution of ethanol and water with a volume ratio of 5:1 is further added after cooling and 1.26 g citric acid is added under stirring condition. The resultant mixtures were stirred for 4 h and heated at 75° C. in a water bath until homogeneous gels formed. After being dried in an oven at 140° C. for 8 h, a xerogel is obtained and ground into powder. Afterwards the powder is placed in a high temperature furnace, in which the temperature is risen to 1350° C. at a heating rate of 500° C./h. The powder is sintered for 2 h at such temperature so as to obtain blue emission fluorescent powder $(Y_{0.95}Tm_{0.05})_2O_3$ with uniform particle size. Under the low-voltage cathode-ray excitation, the blue emission fluorescent powder $(Y_{0.95}Tm_{0.05})_2O_3$ emits blue light with a half-wave width less than 20 nm and good color purity.

Example 4

$(Y_{0.99}Tm_{0.01})_2O_3$ Prepared by Sol-Gel Method 0.99 mmol $Y_2O_3$ and 0.01 mmol $Tm_2O_3$ are dissolved in 1 ml hydrochloric acid and 2 ml deionized water in a vessel at room temperature. 30 ml mixed solution of ethanol and water with a volume ratio of 6:1 is further added after cooling and 1.68 g citric acid is added under stirring condition. The resultant mixtures were stirred for 3 h and heated at 85° C. in a water bath until homogeneous gels formed. After being dried in an oven at 160° C. for 4 h, a xerogel is obtained and ground into powder. Afterwards the powder is placed in a high temperature furnace, in which the temperature is risen to 1200° C.

at a heating rate of 400° C./h. The powder is sintered for 3 h at such temperature so as to obtain blue emission fluorescent powder $(Y_{0.99}Tm_{0.01})_2O_3$ with uniform particle size. Under the low-voltage cathode-ray excitation, the blue emission fluorescent powder $(Y_{0.99}Tm_{0.01})_2O_3$ emits blue light with a half-wave width less than 20 nm and good color purity.

Example 5

$(Y_{0.99}Tm_{0.01})_2O_3$ Prepared by Sol-Gel Method 1.98 mmol $Y(NO_3)_3$ and 0.02 mmol $Tm(NO_3)_3$ are dissolved in 2 ml deionized water in a vessel at room temperature. 30 ml mixed solution of ethanol and water with a volume ratio of 4:1 is further added after cooling and 1.05 g citric acid is added under stirring condition. The resultant mixtures were stirred for 5 h and heated at 100° C. in a water bath until homogeneous gels formed. After being dried in an oven at 180° C. for 7 h, a xerogel is obtained and ground into powder. Afterwards the powder is placed in a high temperature furnace, in which the temperature is risen to 800° C. at a heating rate of 200° C./h. The powder is sintered for 5 h at such temperature so as to obtain blue emission fluorescent powder $(Y_{0.99}Tm_{0.01})_2O_3$ with uniform particle size. Under the low-voltage cathode-ray excitation, the blue emission fluorescent powder $(Y_{0.99}Tm_{0.01})_2O_3$ emits blue light with a half-wave width less than 20 nm and good color purity.

Example 6

$(Y_{0.99}Tm_{0.01})_2O_3$ Prepared by Sol-Gel Method 1.98 mmol $YCl_3$ and 0.02 mmol $TmCl_3$ are dissolved in 2 ml deionized water in a vessel at room temperature. The remaining steps are the same as those in example 1 and then blue emission fluorescent powder $(Y_{0.99}Tm_{0.01})_2O_3$ with uniform particle size is obtained. Under the low-voltage cathode-ray excitation, the blue emission fluorescent powder $(Y_{0.99}Tm_{0.01})_2O_3$ emits blue light with a half-wave width less than 20 nm and good color purity.

Example 7

$(Y_{0.79}Gd_{0.2}Tm_{0.01})_2O_3$ Prepared by Sol-Gel Method 0.79 mmol $Y_2O_3$, 0.2 mmol $Gd_2O_3$ and 0.01 mmol $Tm_2O_3$ are dissolved in 1 ml nitric acid and 2 ml deionized water in a vessel at room temperature. The remaining steps are the same as those in example 1 and blue emission fluorescent powder $(Y_{0.79}Gd_{0.2}Tm_{0.01})_2O_3$ with uniform particle size is obtained. Under the low-voltage cathode-ray excitation, the blue emission fluorescent powder $(Y_{0.79}Gd_{0.2}Tm_{0.01})_2O_3$ emits blue light with a half-wave width less than 20 nm and good color purity.

Example 8

$(Y_{0.29}Gd_{0.7}Tm_{0.01})_2O_3$ Prepared by Sol-Gel Method 0.29 mmol $Y_2O_3$, 0.7 mmol $Gd_2O_3$ and 0.01 mmol $Tm_2O_3$ are dissolved in 1 ml nitric acid and 2 ml deionized water in a vessel at room temperature. The remaining steps are the same as those in example 1 and blue emission fluorescent powder $(Y_{0.29}Gd_{0.7}Tm_{0.01})_2O_3$ with uniform particle size is obtained. Under the low-voltage cathode-ray excitation, the blue emission fluorescent powder $(Y_{0.29}Gd_{0.7}Tm_{0.01})_2O_3$ emits blue light with a half-wave width less than 20 nm and good color purity.

Example 9

$(Gd_{0.99}Tm_{0.01})_2O_3$ Prepared by Sol-Gel Method 0.99 mmol $Gd_2O_3$ and 0.01 mmol $Tm_2O_3$ are dissolved in 1 ml nitric acid and 2 ml deionized water in a vessel at room temperature. The remaining steps are the same as those in example 1 and blue emission fluorescent powder $(Gd_{0.99}Tm_{0.01})_2O_3$ with uniform particle size is obtained. Under the low-voltage cathode-ray excitation, the blue emission fluorescent powder $(Gd_{0.99}Tm_{0.01})_2O_3$ emits blue light with a half-wave width less than 20 nm and good color purity.

Example 10

$(La_{0.999}Tm_{0.001})_2O_3$ Prepared by Sol-Gel Method 0.999 mmol $La_2O_3$ and 0.001 mmol $Tm_2O_3$ are dissolved in 1 ml nitric acid and 2 ml deionized water in a vessel at room temperature. The remaining steps are the same as those in example 1 and blue emission fluorescent powder $(La_{0.999}Tm_{0.001})_2O_3$ with uniform particle size is obtained. Under the low-voltage cathode-ray excitation, the blue emission fluorescent powder $(La_{0.999}Tm_{0.001})_2O_3$ emits blue light with a half-wave width less than 20 nm and good color purity.

Example 11

$(Lu_{0.995}Tm_{0.005})_2O_3$ Prepared by Sol-Gel Method 0.995 mmol $Lu_2(COO)_3$ and 0.005 mmol $Tm_2(COO)_3$ are dissolved in 1 ml nitric acid and 2 ml deionized water in a vessel at room temperature. The remaining steps are the same as those in example 1 and blue emission fluorescent powder $(Lu_{0.995}Tm_{0.005})_2O_3$ with uniform particle size is obtained. Under the low-voltage cathode-ray excitation, the blue emission fluorescent powder $(Lu_{0.995}Tm_{0.005})_2O_3$ emits blue light with a half-wave width less than 20 nm and good color purity.

Example 12

$(Sc_{0.995}Tm_{0.005})_2O_3$ Prepared by Sol-Gel Method 0.995 mmol $Sc_2(CO_3)_3$ and 0.005 mmol $Tm_2(CO_3)_3$ are dissolved in 1 ml nitric acid and 2 ml deionized water in a vessel at room temperature. The remaining steps are the same as those in example 1 and blue emission fluorescent powder $(Sc_{0.995}Tm_{0.005})_2O_3$ is with uniform particle size is obtained. Under the low-voltage cathode-ray excitation, the blue emission fluorescent powder $(Sc_{0.995}Tm_{0.005})_2O_3$ emits blue light with a half-wave width less than 20 nm and good color purity.

Example 13

$(Y_{0.995}Tm_{0.005})_2O_3$ Prepared by High Temperature Solid Phase method 0.995 mmol $Y_2O_3$ and 0.005 mmol $Tm_2O_3$ are placed in an agate mortar and ground to be uniformly mixed at room temperature. Then the powder is transferred to a corundum crucible and placed in a high temperature box-type furnace and then sintered at 1350° C. for 6 h. The sintering product is then placed in a mortar and ground to be uniform after cooling to room temperature. In order to eliminate the surface defect of the fluorescent powder and improve its luminous efficiency, the product is further annealed at 900° C. and blue emission fluorescent powder $(Y_{0.995}Tm_{0.005})_2O_3$ is obtained therewith. When activated by low-voltage cathode-ray, the blue emission fluorescent powder $(Y_{0.995}Tm_{0.005})_2O_3$ emits blue light with high color purity and a half-wave width of less than 20 nm.

Example 14

$(Y_{0.99}Tm_{0.01})_2O_3$ Prepared by High Temperature Solid Phase Method 0.99 mmol $Y_2O_3$ and 0.01 mmol $Tm_2O_3$ are placed in an agate mortar and ground to be uniformly mixed at room temperature. Then the powder is transferred to a corundum crucible and placed in a high temperature box-type furnace and then sintered at 900° C. for 10 h. The sintering product is then placed in a mortar and ground to be uniform after cooling to room temperature. In order to eliminate the surface defect of the fluorescent powder and improve its luminous efficiency, the product is further annealed at 800° C. and blue emission fluorescent powder $(Y_{0.99}Tm_{0.01})_2O_3$ is obtained therewith. When activated by low-voltage cathode-ray, the blue emission fluorescent powder $(Y_{0.99}Tm_{0.01})_2O_3$ emits blue light with high color purity and a half-wave width of less than 20 nm.

Example 15

$(Y_{0.97}Tm_{0.03})_2O_3$ Prepared by High Temperature Solid Phase Method 0.97 mmol $Y_2O_3$ and 0.03 mmol $Tm_2O_3$ are placed in an agate mortar and ground to be uniformly mixed at room temperature. Then the powder is transferred to a corundum crucible and placed in a high temperature box-type furnace and then sintered at 1500° C. for 4 h. The sintering product is then placed in a mortar and ground to be uniform after cooling to room temperature. In order to eliminate the surface defect of the fluorescent powder and improve its luminous efficiency, the product is further annealed at 900° C. and blue emission fluorescent powder $(Y_{0.97}Tm_{0.03})_2O_3$ is obtained therewith. When activated by low-voltage cathode-ray, the blue emission fluorescent powder $(Y_{0.97}Tm_{0.03})_2O_3$ emits blue light with high color purity and a half-wave width of less than 20 nm.

Example 16

$(Y_{0.95}Tm_{0.05})_2O_3$ Prepared by High Temperature Solid Phase Method 0.95 mmol $Y_2O_3$ and 0.05 mmol $Tm_2O_3$ are placed in an agate mortar and ground to be uniformly mixed at room temperature. Then the powder is transferred to a corundum crucible and placed in a high temperature box-type furnace and the sintered at 1200° C. for 8 h. The sintering product is then placed in a mortar and ground to be uniform after cooling to room temperature. In order to eliminate the surface defect of the fluorescent powder and improve its luminous efficiency, the product is further annealed at 950° C. and blue emission fluorescent powder $(Y_{0.95}Tm_{0.05})_2O_3$ is obtained therewith. When activated by low-voltage cathode-ray, the blue emission fluorescent powder $(Y_{0.95}Tm_{0.05})_2O_3$ emits blue light with high color purity and a half-wave width of less than 20 nm.

Example 17

$(Y_{0.99}Tm_{0.01})_2O_3$ Prepared by High Temperature Solid Phase Method 1.98 mmol $Y(NO_3)_3$ and 0.02 mmol $Tm(NO_3)_3$ are placed in an agate mortar and ground to be uniformly mixed at room temperature. Then the powder is transferred to a corundum crucible and placed in a high temperature box-type furnace and then sintered at 1400° C. for 5 h. The sintering product is then placed in a mortar and ground to be uniform after cooling to room temperature. In order to eliminate the surface defect of the fluorescent powder and improve its luminous efficiency, the product is further annealed at 1000° C. and blue emission fluorescent powder $(Y_{0.99}Tm_{0.01})_2O_3$ is obtained therewith. When activated by low-voltage cathode-ray, the blue emission fluorescent powder $(Y_{0.99}Tm_{0.01})_2O_3$ emits blue light with high color purity and a half-wave width of less than 20 nm.

Example 18

$(Y_{0.99}Tm_{0.01})_2O_3$ Prepared by High Temperature Solid Phase Method 1.98 mmol $YCl_3$ and 0.02 mmol $TmCl_3$ are placed in an agate mortar and ground to be uniformly mixed at room temperature. Then the powder is transferred to a corundum crucible and placed in a high temperature box-type furnace and then sintered at 1300° C. for 5 h. The sintering product is then placed in a mortar and ground to be uniform after cooling to room temperature. In order to eliminate the surface defect of the fluorescent powder and improve its luminous efficiency, the product is further annealed at 850° C. and blue emission fluorescent powder $(Y_{0.99}Tm_{0.01})_2O_3$ is obtained therewith. When activated by low-voltage cathode-ray, the blue emission fluorescent powder $(Y_{0.99}Tm_{0.01})_2O_3$ emits blue light with high color purity and a half-wave width of less than 20 nm.

Example 19

$(Y_{0.79}Gd_{0.2}Tm_{0.01})_2O_3$ Prepared by High Temperature Solid Phase Method 0.79 mmol $Y_2O_3$, 0.2 mmol $Gd_2O_3$ and 0.01 mmol $Tm_2O_3$ are placed in an agate mortar and ground to be uniformly mixed at room temperature. The remaining steps are the same as those in example 13 and blue emission fluorescent powder $(Y_{0.79}Gd_{0.2}Tm_{0.01})_2O_3$ is obtained therewith. When activated by low-voltage cathode-ray, the blue emission fluorescent powder $(Y_{0.79}Gd_{0.2}Tm_{0.01})_2O_3$ emits blue light with high color purity and a half-wave width of less than 20 nm.

Example 20

$(Y_{0.49}Gd_{0.5}Tm_{0.01})_2O_3$ Prepared by High Temperature Solid Phase Method 0.49 mmol $Y_2O_3$, 0.5 mmol $Gd_2O_3$ and 0.01 mmol $Tm_2(COO)_3$ are placed in an agate mortar and ground to be uniformly mixed at room temperature. The remaining steps are the same as those in example 13 and blue emission fluorescent powder $(Y_{0.49}Gd_{0.5}Tm_{0.01})_2O_3$ is obtained therewith. When activated by low-voltage cathode-ray, the blue emission fluorescent powder $(Y_{0.49}Gd_{0.5}Tm_{0.01})_2O_3$ emits blue light with high color purity and a half-wave width of less than 20 nm.

Example 21

$(Gd_{0.99}Tm_{0.01})_2O_3$ Prepared by High Temperature Solid Phase Method 1.98 mmol $Gd(NO_3)_3$ and 0.01 mmol $Tm_2O_3$ are placed in an agate mortar and ground to be uniformly mixed at room temperature. The remaining steps are the same as those in example 13 and blue emission fluorescent powder $(Gd_{0.99}Tm_{0.01})_2O_3$ is obtained therewith. When activated by low-voltage cathode-ray, the blue emission fluorescent powder $(Gd_{0.99}Tm_{0.01})_2O_3$ emits blue light with high color purity and a half-wave width of less than 20 nm.

Example 22

$(La_{0.99}Tm_{0.01})_2O_3$ Prepared by High Temperature Solid Phase Method 0.99 mmol $La_2(COO)_3$ and 0.01 mmol $Tm_2O_3$ are placed in an agate mortar and ground to be uniformly mixed at room temperature. The remaining steps are the same as those in example 13 and blue emission fluorescent powder $(La_{0.99}Tm_{0.01})_2O_3$ is obtained therewith. When activated by low-voltage cathode-ray, the blue emission fluorescent powder $(La_{0.99}Tm_{0.01})_2O_3$ emits blue light with high color purity and a half-wave width of less than 20 nm.

Example 23

$(Lu_{0.995}Tm_{0.005})_2O_3$ Prepared by High Temperature Solid Phase Method 0.995 mmol $Lu_2(CO_3)_3$ and 0.005 mmol $Tm_2(CO_3)_3$ are placed in an agate mortar and ground to be uniformly mixed at room temperature. The remaining steps are the same as those in example 13 and blue emission fluorescent powder $(Lu_{0.995}Tm_{0.005})_2O_3$ is obtained therewith. When activated by low-voltage cathode-ray, the blue emission fluorescent powder $(Lu_{0.995}Tm_{0.005})_2O_3$ emits blue light with high color purity and a half-wave width of less than 20 nm.

Example 24

$(Sc_{0.999}Tm_{0.001})_2O_3$ Prepared by High Temperature Solid Phase Method 0.999 mmol $Sc_2O_3$ and 0.001 mmol $Tm_2O_3$ are placed in an agate mortar and ground to be uniformly mixed at room temperature. The remaining steps are the same as those in example 13 and blue emission fluorescent powder $(Sc_{0.999}Tm_{0.001})_2O_3$ is obtained therewith. When activated by low-voltage cathode-ray, the blue emission fluorescent powder $(Sc_{0.999}Tm_{0.001})_2O_3$ emits blue light with high color purity and a half-wave width of less than 20 nm.

The invention claimed is:
1. Oxide luminescent materials activated by trivalent thulium, wherein the oxide luminescent materials activated by trivalent thulium also are compounds with following general formula: $(RE_{1-x}Tm_x)_2O_3$, wherein a range of x is $0<x\le0.05$, RE is any one selected from Lu and Sc or any two selected from Y, Gd, La, Lu and Sc; when activated by low-voltage cathode-ray, the blue emission fluorescent powder emits blue light with high color purity and a half-wave width of less than 20 nm.

2. The oxide luminescent materials activated by trivalent thulium according to claim 1, wherein the range of x is $0<x\le0.03$.

3. A preparation method for oxide luminescent materials activated by trivalent thulium, the oxide luminescent materials activated by trivalent thulium are prepared by Sol-Gel method using metal oxide of $Tm^{3+}$, chloride of $Tm^{3+}$, nitrate of $Tm^{3+}$, carbonate of $Tm^{3+}$ or oxalate of $Tm^{3+}$ and one of oxide of $Lu^{3+}$ or $Sc^{3+}$, chloride of $Lu^{3+}$ or $Sc^{3+}$, nitrate of $Lu^{3+}$ or $Sc^{3+}$, carbonate of $Lu^{3+}$ or $Sc^{3+}$ and oxalate of $Lu^{3+}$ or $Sc^{3+}$ as raw materials or two of oxide of $Y^{3+}$, $Gd^{3+}$, $La^{3+}$, $Lu^{3+}$ or $Sc^{3+}$, chloride of $Y^{3+}$, $Gd^{3+}$, $La^{3+}$, $Lu^{3+}$ or $Sc^{3+}$, nitrate of $Y^{3+}$, $Gd^{3+}$, $La^{3+}$, $Lu^{3+}$ or $Sc^{3+}$, carbonate of $Y^{3+}$, $Gd^{3+}$, $La^{3+}$, $Lu^{3+}$ or $Sc^{3+}$ and oxalate of $Y^{3+}$, $Gd^{3+}$, $La^{3+}$, $Lu^{3+}$ or $Sc^{3+}$ as raw materials, wherein the preparation method comprises following steps:
(1) taking metal oxide of $Tm^{3+}$, chloride of $Tm^{3+}$, nitrate of $Tm^{3+}$, carbonate of $Tm^{3+}$ or oxalate of $Tm^{3+}$ and one of oxide of $Lu^{3+}$ or $Sc^{3+}$, chloride of $Lu^{3+}$ or $Sc^{3+}$, nitrate of $Lu^{3+}$ or $Sc^{3+}$, carbonate of $Lu^{3+}$ or $Sc^{3+}$ and oxalate of $Lu^{3+}$ or $Sc^{3+}$ as raw materials or two of oxide of $Y^{3+}$ $Gd^{3+}$, $La^{3+}$, $Lu^{3+}$ or $Sc^{3+}$, chloride of $Y^{3+}$, $Gd^{3+}$, $La^{3+}$, $Lu^{3+}$ or $Sc^{3+}$, nitrate of $Y^{3+}$, $Gd^{3+}$, $La^{3+}$, $Lu^{3+}$ or $Sc^{3+}$, carbonate of $Y^{3+}$, $Gd^{3+}$, $La^{3+}$, $Lu^{3+}$ or $Sc^{3+}$ and oxalate of $Y^{3+}$, $Gd^{3+}$, $La^{3+}$, $Lu^{3+}$ or $Sc^{3+}$ as raw materials and weighing the raw materials in a stoichiometric ratio of chemical formula $(RE_{1-x}Tm_x)_2O_3$, wherein the range of x is $0<x\le0.05$ and RE is any one selected from Lu and Sc or any two selected from Y, Gd, La, Lu and Sc;
(2) dissolving the metal oxide, carbonate or oxalate of the raw materials in step (1) in hydrochloric acid or nitric acid, or dissolving the chloride and nitrate of the raw materials in step (1) in water directly;
(3) adding citric acid, water and ethanol to form a mixed solution on the foundation of step (2), wherein a volume ratio of the water and the ethanol is 1:2~6 and a molar ratio of the citric acid and metal ion in the raw materials is 2~5:1; stirring the mixed solution at 70·100° C. for 2~6 h, and heating the mixed solution at 120~180° C. for 4~12 h and then obtaining a xerogel;
(4) grinding the xerogel into powder, calcinating the powder at a constant temperature for 2~8 h after the temperature has been risen to 700~1350° C. at a heating rate of 60~500° C./h and then obtaining the oxide luminescent materials activated by trivalent thulium which is activated by low-voltage cathode-ray, the blue emission fluorescent powder emits blue light with high color purity and a half-wave width of less than 20 nm.

4. The preparation method for the oxide luminescent materials activated by trivalent thulium according to claim 3, wherein in the step (3), the volume ratio of the water and the ethanol is 1:3~5 and the molar ratio of the citric acid and the metal ion in the raw materials is 2~4:1; the mixed solution is water bath heated and stirred at 75~85° C. for 2~4 h, then heated at 140~160° C. for 4~8 h to evaporate solvent and obtain the xerogel.

5. The preparation method for the oxide luminescent materials activated by trivalent thulium according to claim 3, wherein in the step (4), comprises grinding the xerogel into powder, placing the powder in a high temperature box-type furnace, calcinating the powder for 3~5 h at a constant temperature after the temperature has been risen to 800~1200° C.

at a heating rate of 300~500° C./h and then obtaining the oxide luminescent materials activated by trivalent thulium.

* * * * *